(12) United States Patent
Gong et al.

(10) Patent No.: US 7,682,118 B2
(45) Date of Patent: Mar. 23, 2010

(54) THREADED SCREW FASTENER WITH MULTIPLE CHARACTERISTIC THREADS

(75) Inventors: Yongping Gong, Glenview, IL (US);
Cheryl L. Panasik, Elburn, IL (US);
Mark D. Latz, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/062,781

(22) Filed: Apr. 4, 2008

(65) Prior Publication Data

US 2008/0260495 A1 Oct. 23, 2008

Related U.S. Application Data

(60) Provisional application No. 60/912,890, filed on Apr. 19, 2007.

(51) Int. Cl.
*F16B 25/10* (2006.01)
(52) U.S. Cl. ..................... 411/387.1; 411/414
(58) Field of Classification Search .............. 411/387.1, 411/412, 414
See application file for complete search history.

(56) References Cited

U.S. PATENT DOCUMENTS

| | | | | |
|---|---|---|---|---|
| 4,652,194 A | * | 3/1987 | Tajima et al. | ............... 411/417 |
| 5,746,039 A | * | 5/1998 | Nystrom | ...................... 52/639 |
| 5,947,670 A | * | 9/1999 | Larson | ..................... 411/387.5 |
| 6,185,896 B1 | * | 2/2001 | Roberts et al. | ................ 52/537 |
| 6,332,741 B1 | * | 12/2001 | Janusz | ......................... 411/412 |
| 6,394,726 B1 | * | 5/2002 | Garvick | ...................... 411/414 |
| 2005/0076751 A1 | | 4/2005 | Panasik | |
| 2006/0291978 A1 | | 12/2006 | Panasik | |

FOREIGN PATENT DOCUMENTS

| CA | 2481162 | 4/2005 |
|---|---|---|
| EP | 1522745 | 4/2005 |

* cited by examiner

*Primary Examiner*—Gary Estremsky
(74) *Attorney, Agent, or Firm*—Levenfeld Pearlstein, LLC

(57) ABSTRACT

A fastener with multiple thread characteristics includes a shank and head. The shank has a penetrating tip distal most from the head. The shank includes a first, conventional thread formation formed therein adjacent the penetrating tip and a second, anti-back-out thread formation adjacent the conventional thread formation, between the conventional thread formation and the head.

17 Claims, 1 Drawing Sheet

ND SCREW FASTENER WITH
THREADED SCREW FASTENER WITH MULTIPLE CHARACTERISTIC THREADS

BACKGROUND OF THE INVENTION

The present invention relates generally to threaded screw fasteners, and more particularly to a new and improved threaded screw fastener which has multiple thread structures. More particularly, the present invention a new and improved threaded screw fastener that has enhanced pull-out and back-out resistance characteristics and is readily manufactured.

Threaded fasteners well known in the art. In one application, threaded fasteners are used to fasten or secure waterproof or environmental membranes to underlying roof decking assemblies. A typical fastener includes a shank portion upon which a plurality of buttress-type threads are formed. The conventional buttress-type threads are formed from a slightly inclined rearward flank surface and a significantly inclined forward flank surface. The threads are formed having a predetermined thread pitch, as measured between the same points of successive thread crest portions, and a predetermined spacing as determined between the root region of the rearward flank surface of a particular thread and the root region of the forward flank surface of the next or successive thread.

It is well-known in the art that the rear flank surface, as well as the pitch, play critical roles in, or effectively determine, the pull-out resistance and anti-back-out characteristics of the fastener, while the forward flank surface, and the spacing, likewise play critical roles in, or effectively determine, the installation or insertion torque characteristics of the fastener.

In order to increase the pull-out and back-out resistant characteristics of the fasteners, a thread structure has been used in which each thread of the fastener includes rearward and forward flank surfaces which effectively serve to enhance the pull-out resistance characteristics or properties of the threaded screw fastener.

While this back-out resistant fastener works well for its intended purpose, it has been found to be quite difficult to manufacture. That is, the cutting die that is used to cut the threads in the shank are quickly worn, requiring frequent replacement and maintenance. As such, the quantity of fasteners that can be fabricated limits the useful life of the cutting die and further limits the efficiency of the manufacturing process.

Accordingly, there is a need for a fastener having high back-out resistant characteristics and is readily manufactured. Desirably, such a fastener has enhanced pull-out resistance and increased manufacturability without adversely impacting the installation characteristics of the fastener.

BRIEF SUMMARY OF THE INVENTION

A fastener with multiple thread characteristics includes a shank and head. The shank has a penetrating tip distal most from the head. The shank includes a first, conventional thread formation formed therein adjacent the penetrating tip and a second, anti-back-out thread formation adjacent the conventional thread formation, between the conventional thread formation and the head.

The fastener includes a washer contiguous with the head, between the head and the shank. The conventional thread formation and the anti-back-out thread formation have about an equal thread spacing. The conventional thread formation is formed in a milled area of the fastener.

The conventional thread formation defines an inclined front flank surface and an inclined rear flank surface each formed at about an equal angle relative to a plane through and normal to the shank. The anti-back-out thread formation includes an inclined front flank surface and an inclined rear flank surface. The front flank surface is formed at an angle of about 30 degrees to about 60 degrees and the rear flank surface is formed at an angle of about zero degrees to about 8 degree relative to a plane through and normal to the shank.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
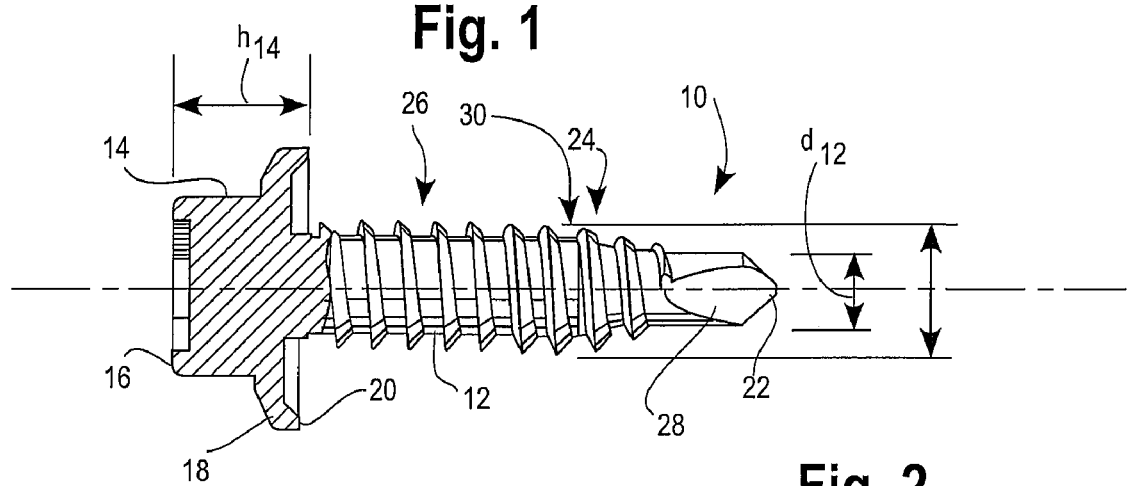
FIG. 1 is a plan view of a threaded screw fastener with multiple thread characteristics embodying the principles of the present invention.
Figure 2:
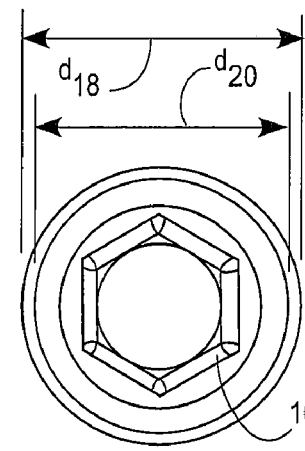
FIG. 2 is top view of the fastener.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular to FIG. 1 there is shown a threaded screw fastener with multiple thread characteristics 10 embodying the principles of the present invention. The fastener 10 includes generally a shank 12 and a head 14. The illustrated fastener head includes a hexagonal driver engagement portion 16 contiguous with an intermediate washer portion 18. The washer portion 18 has a downwardly depending outer rim 20.

The shank 12 is formed with a penetrating tip 22, a first, conventional thread formation 24 and a second, anti-back-out thread formation 26. The first thread 24 is formed from just beyond the tip 22 (at about a recessed portion 28) and extends along the shank 12 to a milling area 30 of the shank 12. The recessed portion 28 is provided so that a self-drilling tip (as illustrated) or gimlet tip can be provided in the fastener 10.

Figure 3:
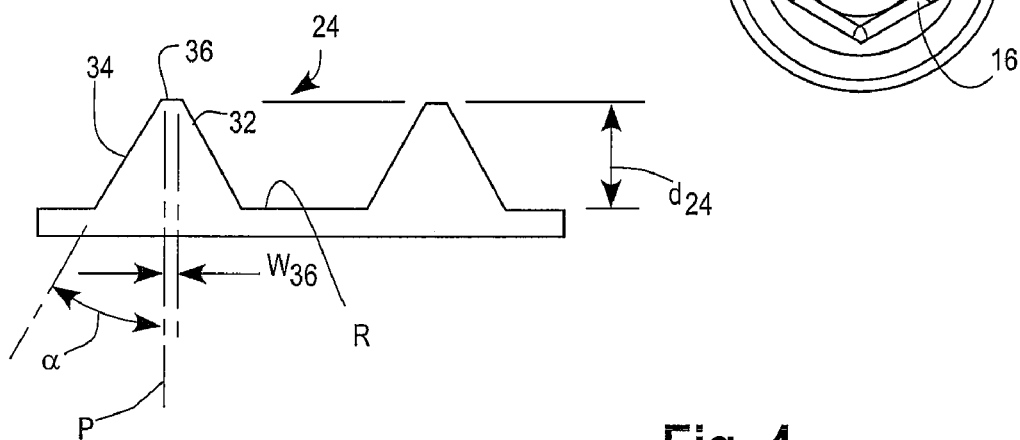
FIG. 3 is an enlarged, partial cross-sectional view of the first (conventional) thread structure on the fastener.

The first thread portion 24 is formed as a conventional machine or spaced thread. As seen in FIG. 3, the first thread 24 is formed with about a 60 degree inclined front flank surface 32 and inclined rear flank surface 34. As illustrated, the front and rear surfaces 32, 34 are inclined at about the same angle α relative to a plane P through and normal to the shank 12. In a present ¼-14×⅞ inch fastener, the angle α is about 30 degrees. The ¼-14 conventional thread 24 has a spacing $S_{24}$ between threads 24 of about 0.071 inches, the depth $d_{24}$ of the thread 24 (from the root R to the top 36) is about 0.028 inches, and the top 36 of the thread 24 has a width $w_{36}$ of about 0.005 inches. As set forth above, the conventional thread 24 is formed from the tip recess 28 to the milling area 30 of the fastener 10.

Figure 4:
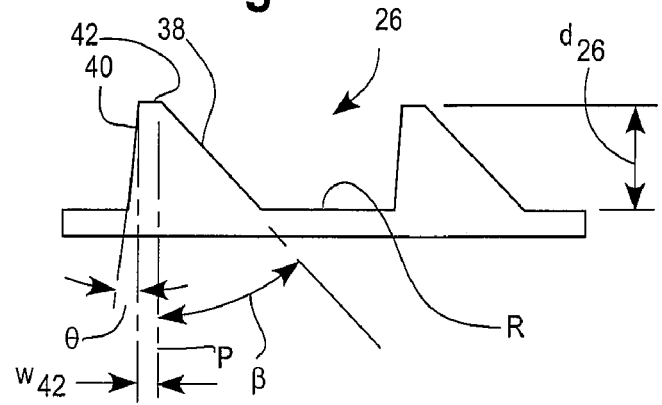
FIG. 4 is an enlarged, partial cross-sectional view of the second (anti-back-out) thread structure of the fastener.

From the milling area 30 (at the end of the conventional thread 24) to the washer 18 the thread 26 is formed as an anti-back-out thread. The anti-back-out thread 26, as seen in FIG. 4, has a more inclined front flank surface 38 and a steeper inclined rear flank surface 40. The anti-back-out thread 26 as illustrated will be recognized by those skilled in the art.

In the illustrated ¼-14×⅞ fastener, for the anti-back-out threads 26, the angle β of the front flank surface 38 relative to a plane P through and normal to the shank 12 can be about 30 degrees to about 60 degrees and the angle θ of the rear flank surface 40 relative to the plane P through and normal to the shank 12 can be about 0 degrees to about 8 degrees. The spacing $S_{26}$ between the threads 26 is about equal to the spacing $S_{24}$ of the conventional thread 24 or about 0.071 inches. The depth $d_{26}$ of the thread 26 (from the root R to the top 42) is about 0.025 inches to about 0.050 inches, and the top 42 of the thread 26 has a width $w_{42}$ of about 0.003 to about 0.008 inches.

In the present ¼-14×⅞ fastener 10, the diameter $d_{12}$ across the shank 12 at the milled area 30 is about 0.140 to about 0.210 inches and the diameter $d_{26}$ across the threads 26 (at about the widest point) is about 0.240 to about 0.260 inches. The diameter $d_{18}$ across the washer 18 is about 0.545 to 0.560 inches, the diameter $d_{20}$ across the depending lip portion 20 of the washer 18 is about 0.505 inches and the height $h_{14}$ of the fastener head 14 (including the washer 18) is about 0.255 inches. The length 110 of the fastener 10 from the washer lip 20 to the tip 22 (essentially the length of the shank) is about 0.915±0.015 inches.

It will be appreciated that the present fastener 10 provides the benefits and advantages of an anti-back-out fastener, in that the engaged thread portion, when installed is of the anti-back-out 26 configuration. The fastener 10 also provides the advantage of ease of manufacture in that the entire shank 12 does not require the formation (cutting) of the anti-back-out thread 26, which is a more demanding thread to form (e.g., formation vis-à-vis the stress on the cutting die).

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A fastener comprising:
   a shank; and
   a head,
   the shank having a penetrating tip distal most from the head, the shank including a conventional thread formation and an anti-back-out thread formation having an inclined front flank surface and an inclined rear flank surface, wherein the front flank surface is formed at an angle of about 30 degrees to about 60 degrees and wherein the rear flank surface is formed at an angle that is greater than zero and less than 30 degrees relative to a plane through and normal to the shank and passing through a top of the thread, wherein the conventional thread formation is adjacent the anti-back-out thread formation, between the anti-back-out thread formation and the penetrating tip, wherein the conventional thread formation defines an inclined front flank surface and an inclined rear flank surface, wherein each flank surface is formed at about an equal angle relative to a plane through and normal to the shank.

2. The fastener in accordance with claim 1 wherein the angle of the rear flank surface is about zero degrees to about 8 degree relative to a plane through and normal to the shank.

3. The fastener in accordance with claim 1 wherein each thread in the anti-back-out thread formation has about an equal thread spacing from each adjacent thread.

4. The fastener in accordance with claim 1 wherein at least a portion of the thread formation is formed in a milled area of the fastener.

5. The fastener in accordance with claim 1 including a washer contiguous with the head, between the head and the shank.

6. The fastener in accordance with claim 1 wherein each thread of the anti-back-out thread formation includes a top of the thread between the inclined front flank surface and the inclined rear flank surface, the top of the thread being about 0.003 to about 0.008 inches, and wherein a height of each thread in the anti-back-out thread formation is about 0.025 to about 0.050 inches.

7. A fastener with multiple thread characteristics comprising:
   a shank and head, the shank having a penetrating tip distal most from the head, the shank including
   a first, conventional thread formation formed therein adjacent the penetrating tip, wherein the first conventional thread formation defines an inclined front flank surface and an inclined rear flank surface, wherein each flank surface is formed at about an equal angle relative to a plane through and normal to the shank and passing through a top of the thread; and
   a second, anti-back-out thread formation adjacent the conventional thread formation, between the conventional thread formation and the head, the anti-back-out thread formation including an inclined front flank surface and an inclined rear flank surface, wherein the front flank surface is formed at an angle of about 30 degrees to about 60 degrees and wherein the rear flank surface is formed at an angle less than the angle of the front flank surface.

8. The fastener in accordance with claim 7 wherein the angle of the rear flank surface is about zero degrees to about 8 degree relative to a plane through and normal to the shank.

9. The fastener in accordance with claim 7 wherein the conventional thread formation and the anti-back-out thread formation have about an equal thread spacing.

10. The fastener in accordance with claim 8 wherein the conventional thread formation defines an inclined front flank surface and an inclined rear flank surface each formed at an angle relative to a plane through and normal to the shank and wherein the anti-back-out thread formation includes an inclined front flank surface and an inclined rear flank surface and wherein the front flank surface is formed at an angle of about 30 degrees to about 60 degrees and wherein the rear flank surface is formed at an angle of about zero degrees to about 8 degree relative to a plane through and normal to the shank.

11. The fastener in accordance with claim 7 wherein the conventional thread formation is formed in a milled area of the fastener.

12. The fastener in accordance with claim 7 including a washer contiguous with the head, between the head and the shank.

13. The fastener in accordance with claim 7 wherein each thread of the conventional thread formation includes a top of the thread between an inclined front flank surface and an inclined rear flank surface and each thread of the anti-back-out thread formation includes a top of the thread between an inclined front flank surface and an inclined rear flank surface, the conventional thread formation top of thread being about 0.005 inches and the anti-back-out thread formation top of thread being about 0.003 to about 0.008 inches.

14. The fastener in accordance with claim 7 wherein the conventional thread formation defines an inclined front flank surface and an inclined rear flank surface each formed at an angle relative to a plane through and normal to the shank equal to about one another.

15. The fastener in accordance with claim 14 wherein the angle of the conventional thread formation defining the inclined front flank surface and the inclined rear flank surface relative to a plane through and normal to the shank is about 60 degrees.

16. A fastener with multiple thread characteristics comprising:

a shank and head, the shank having a penetrating tip distal most from the head, the shank including a first, conventional thread formation formed therein adjacent the penetrating tip, the conventional thread formation defining an inclined front flank surface and an inclined rear flank surface, each formed at an angle relative to a plane passing through a top of the thread and through and normal to the shank, equal to about one another, the fastener including a second, anti-back-out thread formation adjacent the conventional thread formation, between the conventional thread formation and the head, the anti-back-out thread formation including an inclined front flank surface and an inclined rear flank surface, wherein the front flank surface is formed at an angle of about 60 degrees and wherein the rear flank surface is formed at an angle of about zero degrees to about 8 degrees relative to a plane passing through a top of the thread and through and normal to the shank, and wherein the conventional thread formation and the anti-back-out thread formation have about an equal thread spacing.

17. The fastener in accordance with claim 16 wherein each thread of the conventional thread formation is substantially symmetrical.

* * * * *